United States Patent
Lee et al.

(10) Patent No.: US 10,462,106 B2
(45) Date of Patent: Oct. 29, 2019

(54) SOFTWARE DEFINED NETWORK ROUTING FOR SECURED COMMUNICATIONS AND INFORMATION SECURITY

(71) Applicant: BANK OF AMERICA CORPORATION, Charlotte, NC (US)

(72) Inventors: Jisoo Lee, Chesterfield, NJ (US); Yair Frankel, Westfield, NJ (US)

(73) Assignee: Bank of America Corporation, Charlotte, NC (US)

( * ) Notice: Subject to any disclaimer, the term of this patent is extended or adjusted under 35 U.S.C. 154(b) by 168 days.

(21) Appl. No.: 15/663,130

(22) Filed: Jul. 28, 2017

(65) Prior Publication Data

US 2019/0036884 A1    Jan. 31, 2019

(51) Int. Cl.
| | |
|---|---|
| *G06F 15/16* | (2006.01) |
| *H04L 29/06* | (2006.01) |
| *H04L 29/08* | (2006.01) |
| *H04L 12/747* | (2013.01) |

(52) U.S. Cl.
CPC ........ *H04L 63/0281* (2013.01); *H04L 45/742* (2013.01); *H04L 63/0245* (2013.01); *H04L 63/107* (2013.01); *H04L 67/2842* (2013.01); *H04L 67/18* (2013.01)

(58) Field of Classification Search
None
See application file for complete search history.

(56) References Cited

U.S. PATENT DOCUMENTS

| | | | |
|---|---|---|---|
| 9,426,029 B2 * | 8/2016 | Saavedra | H04L 41/0816 |
| 2016/0218947 A1 * | 7/2016 | Hughes | H04J 11/00 |
| 2017/0060615 A1 * | 3/2017 | Thakkar | G06F 9/45558 |

OTHER PUBLICATIONS

Open Networking User Group, Onug Software-Defined WAN Use Case, Oct. 2014, 10 pages.
Banks, E., "Software-Defined WAN: A Primer," http://www.networkingcomputing.com/print/1307047, Sep. 9, 2014, 7 pages.
SDX Central, "What is Software Defined WAN (or SD-WAN)'?," https://www.sdxcentral.com/sd-wan/definitions/software-defined-sdn-wan/, received Jul. 14, 2017, pp. 1-4.

* cited by examiner

*Primary Examiner* — Brandon S Hoffman
(74) *Attorney, Agent, or Firm* — Michael A. Springs

(57) ABSTRACT

A system that includes a routing device and a proxy server in a private network. The routing device is configures itself to route data traffic for a network device within a private network using private links. The routing device forwards an access request requesting access to a destination address in a public network from the network device to the proxy server. The proxy server determines whether the access request satisfies a set of access rules and generates an access request response. The routing device forwards the access request response from the proxy server to the network device. The routing device configures itself to route data traffic between the network device and the destination address using public links in response to receiving an access approval message. The routing device communicates data traffic between the network device and the destination address using public links.

20 Claims, 3 Drawing Sheets

SOFTWARE DEFINED NETWORK ROUTING FOR SECURED COMMUNICATIONS AND INFORMATION SECURITY

TECHNICAL FIELD

The present disclosure relates generally to information security, and more specifically to a system using secured communications and data access control.

BACKGROUND

In a network environment, network devices may be in data communication with other network devices within their network as well as in other networks. These network environments allow files to be shared among network devices in different networks. One of the technical challenges that occurs when files are exchanged between network devices in different networks is controlling data leakage, unauthorized access to files, and preventing malicious activities. Allowing network devices in a private network to communicate with network devices in a public network leaves the private network vulnerable online threats and poses several network security challenges. For example, malicious data may be downloaded and introduced to the private network from the public network.

Conventional systems use a proxy server to filter communications between a network device in a private network and a network device in a public network. Using a proxy server to filter communications provides security but introduces additional security overhead, increases delays and latency, and reduces network bandwidth. Increasing latency reduces the performance of some operations such as streaming data content (e.g. streaming video). Conventional systems are unable to provide adequate network security without reducing system resources and/or degrading performance by introducing additional delays and latency.

Thus, it is desirable to provide a solution that offers increased network security without reducing the performance of the system and network when allowing communications between network devices in a private network and a public network.

SUMMARY

One of the technical challenges that occurs when files are exchanged between network devices in different networks is controlling data leakage, unauthorized access to files, and preventing malicious activities. Allowing network devices in a private network to communicate with network devices in a public network leaves the private network vulnerable online threats and poses several network security challenges. Conventional systems use a proxy server to filter communications between a network device in a private network and a network device in a public network. Using a proxy server to filter communications provides security but introduces additional security overhead, increases delays and latency, and reduces network bandwidth. Increasing latency reduces the performance of some operations such as streaming data content (e.g. streaming video). Conventional systems are unable to provide adequate network security without reducing system resources and/or degrading performance by introducing additional delays and latency.

The system described in the present application provides a technical solution that enables the system to selectively allow network devices in the private network to access content in a public network in real-time. In one embodiment, the system is configured to receive a request to access content in the public network. The system determines whether the content associated with the request satisfies a set of access rules and approves the request in response to determining the content satisfies the set of access rules. For example, the system may apply one or more access rules to determine whether the content is free of viruses and malware and/or to determine whether the user requesting the content has permission to access the content. By applying the one or more access rules, the system provides improved network security by ensuring that accessing the requested content does not leave the system and network vulnerable to malicious data and activities. The system provides a technical advantage by allowing the network device to access the content in the public network using public links, for example, a broadband connection, in response to approving the request. Allowing the network device to use public links to access the requested content improves the operation of the system by providing increased data speeds for accessing or streaming data content. In contrast to conventional systems, using public links for accessing content does not introduce additional latency or reduce the bandwidth of the private network. Additionally, the system provides a technical solution that eliminates the need for deploying secret certificates to network devices along a path or for providing costly dedicated circuits between network devices.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
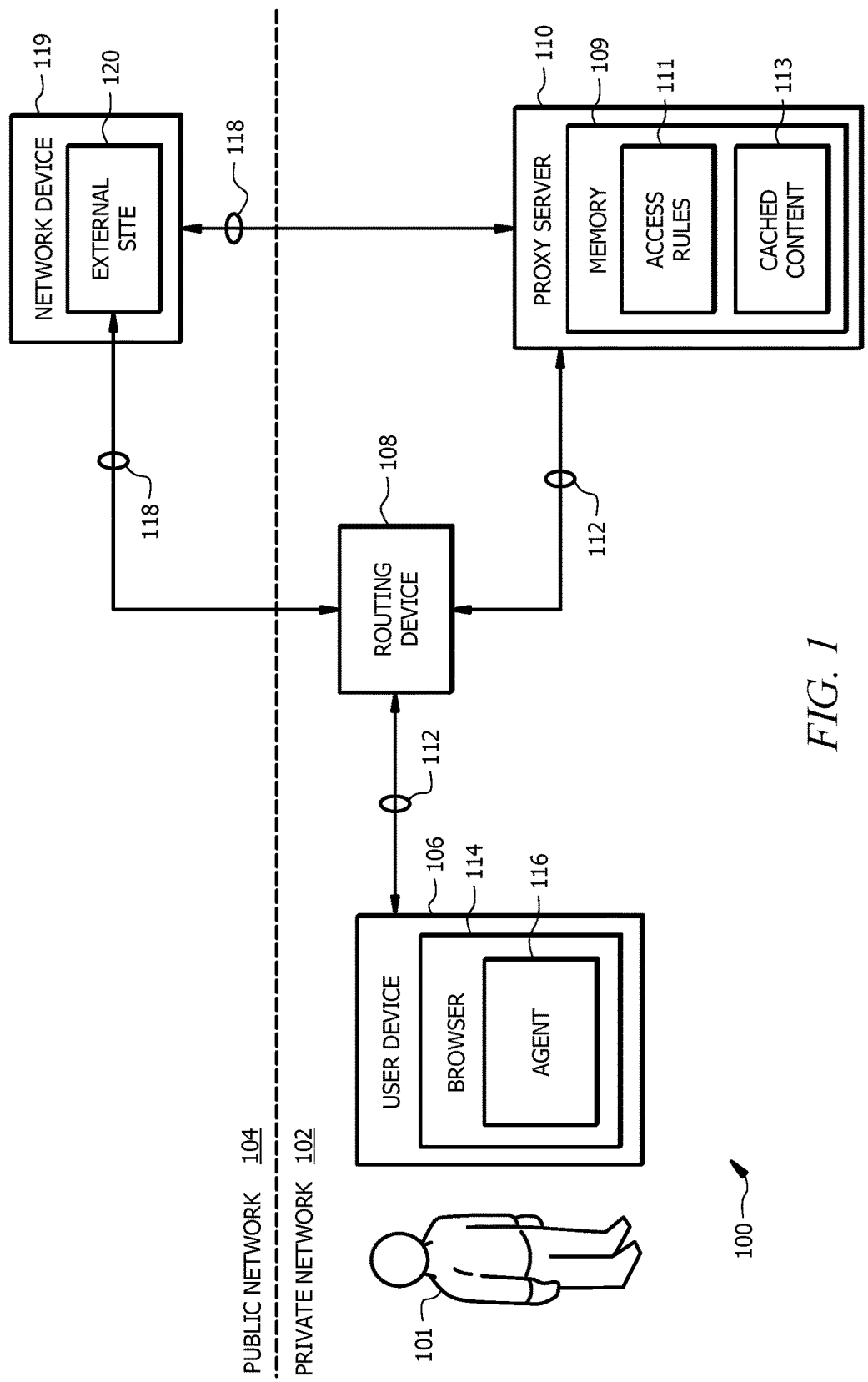
FIG. 1 is a schematic diagram of an embodiment of a system configured to employ data access control for routing between private networks and public networks.

FIG. 1 is a schematic diagram of an embodiment of a system 100 configured to employ data access control for routing between private networks 102 and public networks 104. In FIG. 1, a user 101 operating a user device 106 in a private network 102 wants to access content in a public network 104. For example, the user 101 may want to download a file or stream media content from the public network 104. For instance, the user 101 may want to stream video or music content from a host server or download a file from a public cloud server. As another example, the user 101 may want to upload files to the public network 104. For instance, the user 101 may want to upload files to a public cloud server. In these examples, the user 101 uses the user device 106 to request access to the data content in the public network 104.

The public network 104 is any suitable type of wireless and/or wired network including, but not limited to, all or a portion of the Internet, an Intranet, a peer-to-peer network, the public switched telephone network, a cellular network, and a satellite network. The public network 104 is configured to support any suitable communication protocols as would be appreciated by one of ordinary skill in the art upon viewing this disclosure. The public network 104 comprises one or more network devices 119. Examples of network device 119 include, but are not limited to, web clients, web servers, user devices, mobile phones, computers, tablet computers, laptop computers, and/or any other suitable type of network device. For instance, a network device 119 may be a server configured to operate as a cloud server, a software as a service (SaaS) server, a database, a file repository, a file hosting server, or any other suitable file sharing service. In one embodiment, the network device 119 is configured to host an external site 120 (e.g. a website) with data content that is accessible using a destination address (e.g. a uniform resource locator (URL) or uniform resource identifier (URI)).

The private network 102 is any suitable type of wireless and/or wired network. The private network 102 is configured to support any suitable communication protocols as would be appreciated by one of ordinary skill in the art upon viewing this disclosure. The private network 102 uses a combination of public links 118 and private links 112 to communicate data between network devices. Public links 118 are connections configured to allow data communication between a network device in the private network 102 and a network device in the public network 104. Examples of a public link 118 includes, but is not limited to, a broadband connection, a satellite connection, a fiber optic connections, a digital subscriber line (DSL) connection, and a cable connection. Public links 118 allow for increased data speeds, but are not protected by the private network 102 and may be vulnerable to malicious activities by bad actors. In contrast to public links 118, private links 112 are contained within the private network 102 to provide secure channels of communications between network devices. Private links 112 are connections configured to allow data communications between network devices in the private network 102.

The private network 102 comprises one or more user devices 106, a routing device 108, and a proxy server 110. The private network 102 may comprise any suitable number of and/or combinations of network devices. The private network 102 may be configured as shown or in any other suitable configuration. In FIG. 1, the user device 106, the routing device 108, and the proxy server 110 are in signal communication with each other using private links 112. The routing device 108 and the proxy server 110 are also in signal communication with network device 119 in the public network 104 using public links 118.

Examples of the user device 106 include, but are not limited to, desktop computers, mobile phones, tablet computers, and laptop computers. The user device 106 is generally configured to communicate data with other network devices in the private network 102 and the public network 104. The user device 106 may be configured to allow the user 101 to download or upload files, view or modify files, stream media content (e.g. video or music), and/or perform any other function with data. In one embodiment, the user device 106 is configured to implement a browser 114 that allows the user 101 to access data content.

The browser 114 is configured to allow the user device 106 to retrieve and present data content from the private network 102 and the public network 104. The user 101 provides a destination address (e.g. a URL) to the browser 114 to identify the location of data content and to request the data content. For example, the user 101 may provide a URL for video content to the browser 114 to indicate the location of the requested video content for streaming. In one embodiment, the browser 114 uses an agent 116 to request permission to access data content from the public network 104. An example of an agent 116 includes, but is not limited to, a browser plug-in. For example, the agent 116 may be configured to monitor an address bar in the browser 114 for destination addresses. The agent 116 may initiate a request for permission to access the content located at the destination address in the public network 104 in response to detecting the destination address. For instance, the agent 116 may send a request for access to the content to the routing device 108. An example of requesting and accessing data content from the public network 104 is described in FIG. 3.

In one embodiment, the routing device 108 is a software defined wide area network (SDWAN) device. In other embodiments, the routing device 108 is any other suitable network routing device. Additional information about the routing device 108 is described in FIG. 2. The routing device 108 is generally configured to provide connectivity between user device 106 and other network device. The routing device 108 is also configured to selectively provide communications between the user device 106 and network devices 119 in the public network 104. For example, the routing device 108 may be configured by default to only allow the user device 106 to communicate with network devices in the private network 102 using private links 112. In response to receiving an approval to a content request, the routing device 108 may be configured to allow the user device 106 to communicate with a network device 119 in the public network 104 using public links 118 to access data content. An example of the routing device 108 in operation is described in FIG. 3.

The proxy server 110 may also be referred to as a proxy data center. The proxy server 110 is generally configured to process a request for accessing data content from the public network 104 to determine whether to approve the access request. The proxy server 110 applies one or more access rules 111 to determine whether to approve the access request. For example, the access rules 111 may comprise instructions or rules for approving or denying an access request in response to authenticating the user 101, determining permission settings for the user 101, analyzing the requested content, scanning the requested content for viruses or malware, applying filtering logic that limits access to content based on location or department, and/or applying any other suitable type of rules. In one embodiment, the proxy server 110 is configured to determine whether the requested content has been previously requested or accessed and is cached in memory 109. The proxy server 110 may access and analyze the cached content to apply the access rules 111 when the content has been cached in memory 109. The proxy server 110 may access the requested content from the destination address in the public network 104 when the content is not cached in memory 109. The proxy server 110 may be configured to be centralized to support a number of network devices and locations. Configuring proxy server 110 to be centralized eliminates the need to install proxy servers 110 at every site location in the network and reduces the cost and complexity of the system 100. An example of the proxy server 110 in operation is described in FIG. 3.

The proxy server 110 comprises a memory 109. The memory 109 comprises one or more disks, tape drives, or solid-state drives, and may be used as an over-flow data storage device, to store programs when such programs are selected for execution, and to store instructions and data that are read during program execution. The memory 109 may be volatile or non-volatile and may comprise read-only memory (ROM), random-access memory (RAM), ternary content-addressable memory (TCAM), dynamic random-access memory (DRAM), and static random-access memory (SRAM). The memory 109 is operable to store access rules 111, cached content 113, and/or any other data or instructions.

Cached content 113 includes data content that was previously downloaded or access by a network device in the private network 102 and/or the proxy server 110. Examples of cached content 113 include, but are not limited to, electronic documents, text files, images, video files, music files, and any other suitable type of file. Using cached content 113 improves the speed and operation of the system 100 by reusing previously stored data content and/or results rather than downloading the data content every time it is requested. In some embodiments, the proxy server 110 may be configured to periodically delete cached content. For example, the proxy server 110 may be configured to delete cached content every 24 hours to free memory resources. The proxy server 110 may be configured to delete cached content after any suitable amount time has passed.

Figure 2:
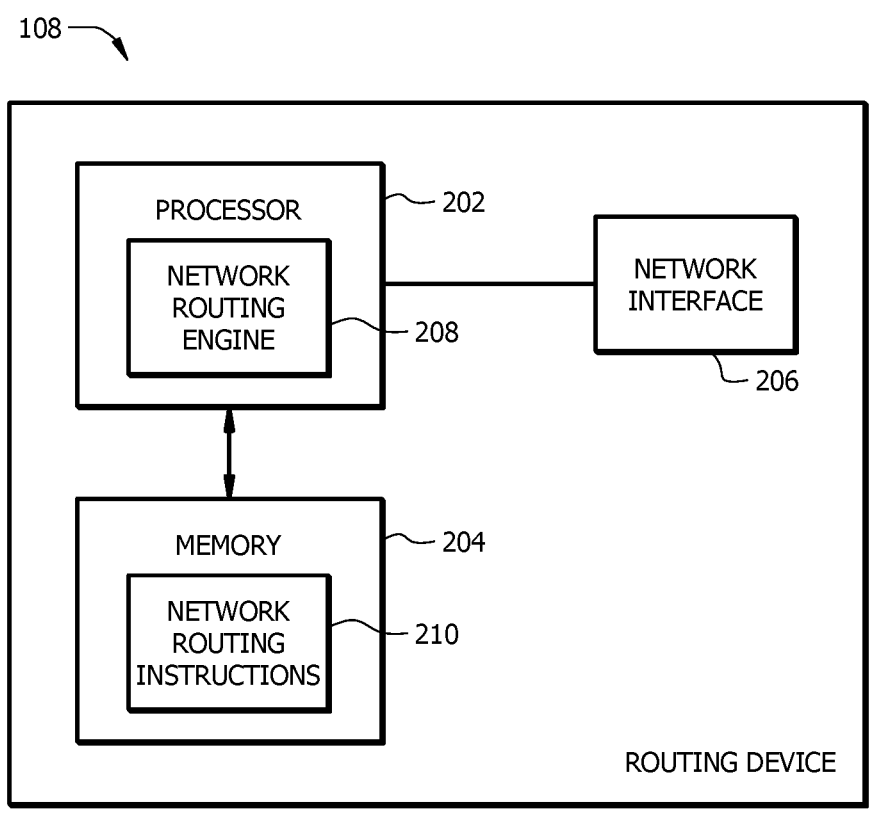
FIG. 2 is a schematic diagram of an embodiment of a routing device.

FIG. 2 is a schematic diagram of an embodiment of a routing device 108. The routing device 108 comprises a processor 202, a memory 204, and a network interface 206. The routing device 108 may be configured as shown or in any other suitable configuration.

The processor 202 comprises one or more processors operably coupled to the memory 204. The processor 202 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 202 may be a programmable logic device, a microcontroller, a microprocessor, or any suitable combination of the preceding. The processor 202 is communicatively coupled to and in signal communication with the memory 204. The one or more processors are configured to process data and may be implemented in hardware or software. For example, the processor 202 may be 8-bit, 16-bit, 32-bit, 64-bit or of any other suitable architecture. The processor 202 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions to implement a network routing engine 208. In an embodiment, the network routing engine 208 is implemented using logic units, FPGAs, ASICs, DSPs, or any other suitable hardware. The network routing engine 208 is configured to implement a specific set of rules or process that provides an improved technological result.

In one embodiment, the network routing engine 208 is configured to selectively allow communications between a network device (e.g. user device 106) in a private network 102 and network devices in a public network 104. In this configuration, the network routing engine 208 provides improved network security and data access control by controlling which content a network device has access to in a public network 104 using public links 118 (e.g. broadband connections). The usage of public links 118 for accessing content allows for reduced latency and improved speeds compared to using private links 112 which have additional security overhead and latency. An example of the network routing engine 208 operating in this configuration is described in FIG. 3.

The memory 204 comprises one or more disks, tape drives, or solid-state drives, and may be used as an over-flow data storage device, to store programs when such programs are selected for execution, and to store instructions and data that are read during program execution. The memory 204 may be volatile or non-volatile and may comprise ROM, RAM, TCAM, DRAM, and SRAM. The memory 204 is operable to store network routing instructions 210 and/or any other data or instructions. The network routing instructions 210 comprise any suitable set of instructions, logic, rules, or code operable to execute the network routing engine 208.

The network interface 206 is configured to enable wired and/or wireless communications. The network interface 206 is configured to communicate data through the system 100 and/or any other system or domain. For example, the network interface 206 may be configured for communication with a modem, a switch, a router, a bridge, a server, or a client. The processor 202 is configured to send and receive data using the network interface 206.

Figure 3:
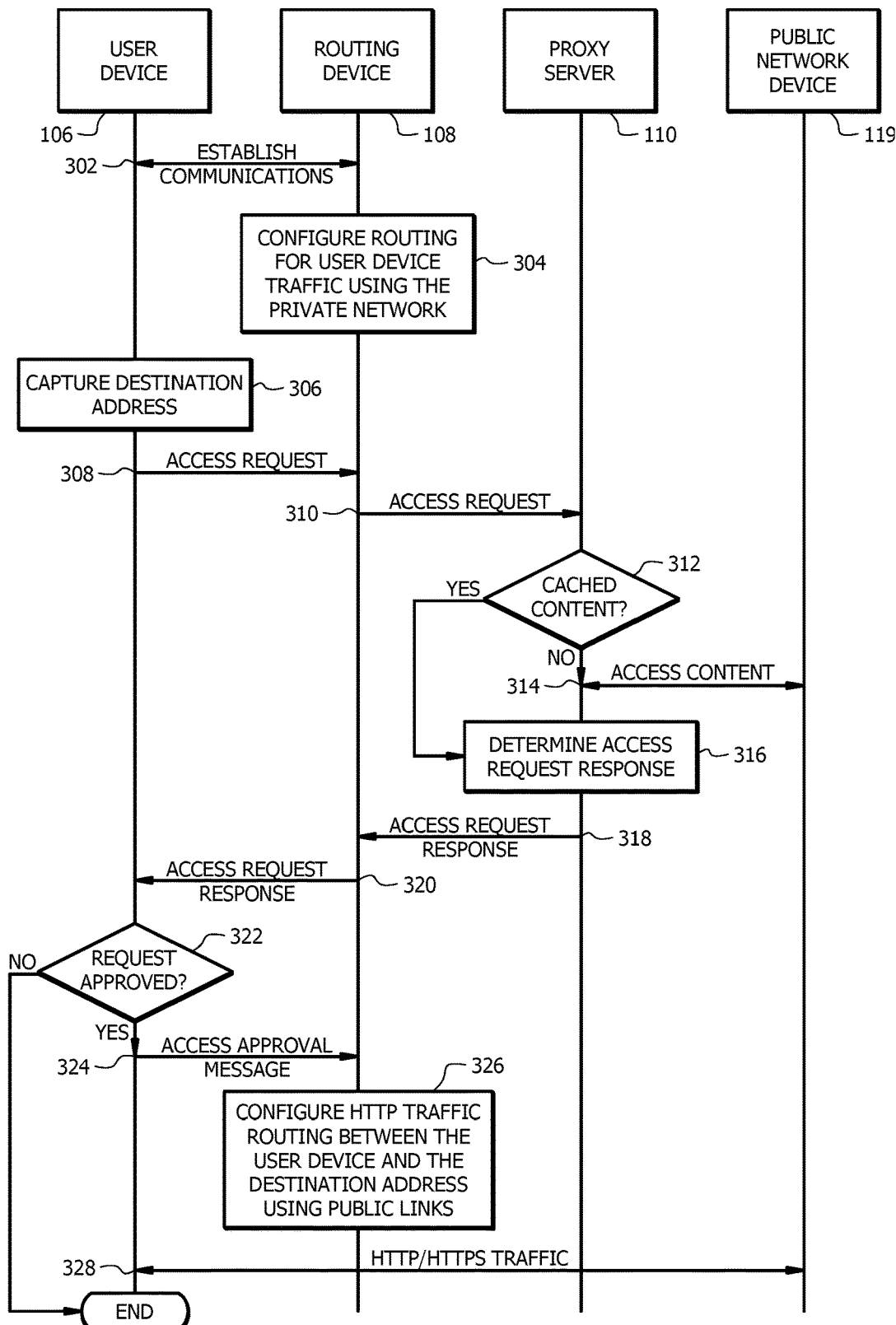
FIG. 3 is a protocol diagram of an embodiment of a network routing method between a private network and a public network.

FIG. 3 is a protocol diagram of an embodiment of a network routing method 300 between a private network 102 and a public network 104. The system 100 implements method 300 to determine whether a user device 106 in the private network 102 is able to access content in the public network 104. The system 100 employs the routing device 108 to selectively allow the user device 106 to communicate with network devices 119 in the public network 104 in response to determining the user device 106 and/or its user 101 are approved to access the requested content.

Conventional systems use a proxy server 110 to filter communications between the user device 106 in the private network 102 and a network device in a public network 104. Using the proxy server 110 to filter communications provides security but introduces additional security overhead, increases delays and latency, and reduces network bandwidth. In contrast, system 100 uses an unconventional configuration that allows the user device 106 to access content from the public network 102 using public links 118 instead of using private links 112 via the proxy server 110. Allowing the network device to use public links 118 (e.g. broadband connections) improves the operation of the system 100 by allowing increased data speeds for accessing or streaming data content. In contrast to conventional systems, using public links 112 for accessing content does not introduce additional latency or reduce the bandwidth of the private network 102.

A non-limiting example is provided to illustrate how the system 100 implements method 300 to selectively allow user device 106 to access content from a public network 104 using public links 118. As an example, a user 101 may employ the user device 106 to download a file from a public cloud server or to stream a video from a sever in the public network 104.

At step 302, the user device 106 establishes communications with the routing device 108. For example, the user device 106 may establish a hypertext transfer protocol (HTTP) or a hypertext transfer protocol secure (HTTPS) connection with the routing device 108. In other examples, the user device 106 may establish communications with the routing device 108 using any suitable technique or protocol as would be appreciated by one of ordinary skill in the art. In one embodiment, establishing communications between the user device 106 and the routing device 108 may comprise authenticating the user 101. The system 100 may employ any suitable authentication protocol for authenticating the user 101 and establishing communications between the user device 106 and the routing device 108.

At step 304, the routing device 108 configures data traffic routing for the user device 106 using the private network 102. The routing device 108 configures itself to only allow the user device 106 to communicate with other network device in the private network 102 and to use private links 112. The routing device 108 is configured to receive data traffic for the user device 106 and to forward the data traffic to the appropriate destination within the private network 102. The routing device 108 does not allow the user device 106 to use public links 118 or to communicate with network devices 119 in the public network 104.

At step 306, the user device 106 captures a destination address for data content in the public network 104. In one embodiment, the agent 116 detects when a user 101 enters a destination address into the browser 114 and captures the destination address. In other embodiments, the user device 106 may employ any other suitable technique for detecting and/or capturing a destination address.

At step 308, the user device 106 sends an access request to the proxy server 110 via the routing device 108. The access request comprises the destination address (e.g. URL) for the content in the public network 104. In some embodiments, the access request further comprises other information including, but not limited to, a device identifier for the user device 106, device information for the user device 106, the browser 114, and/or agent 116, a user identifier for the user 101, and user information about the user 101. The access request may comprise any suitable type of information or combinations thereof. The user device 106 sends the access request using any suitable type of message formatting and/or messaging protocol. For example, the user device 106 may send the access request using an HTTP or HTTPS messaging protocol. As another example, the user device 106 may send the access request using a secure channel or tunnel. At step 310, the routing server 108 receives the access request from the user device 106 and forwards the access request to the proxy server 110.

At step 312, the proxy server 110 determines whether the content associated with the access request is cached in memory 109. For example, the proxy server 110 may use the destination address to determine whether content associated with the destination address has previously accessed or downloaded and has been cached into memory 109. The proxy server 110 proceeds to step 314 in response to determining the content associated with the access request is not cached in the memory 109 of the proxy server 110.

At step 314, the proxy server 110 accesses the content associated with the access request. The proxy server 110 uses the destination address to download at least a portion of the content from the network device 119 in the public network 104. For example, the proxy server 110 may use the destination address to view an external site 120 and to download one or more files from the external site 120. As another example, the proxy server 110 may use the destination address to download a least a port of a data stream (e.g. music or video stream) from an external site 120.

Returning to step 312, the proxy server 110 retrieves the cached content from memory 109 and proceeds to step 316 in response to determining the content associated with the access request is cached in the memory 109 of the proxy server 110.

At step 316, the proxy server 110 determines an access request response for the access request. The proxy server 110 determines whether content associated with the access request satisfies a set of access rules 111. For example, the proxy server 110 may perform a threat detection analysis on the content to determine whether the requested content is safe to introduce to the private network 102. The threat detection analysis may comprise a virus scan, a malware scan, or any other suitable type of threat detection operation.

As another example, the proxy server 110 may identify the user 101 associated with the access request and determine permission settings for the user 101. For example, the access request may comprise a user identifier and the proxy server 110 may use the user identifier to obtain permission settings for the user 101. In one embodiment, the permission settings may indicate restrictions or types of content and/or destination addresses the user 101 is prohibited from accessing. In another embodiment, the permission settings may indicate types of content and/or destinations the user 101 is allowed to access. The proxy server 110 determines whether the user 101 is allowed to access the requested content based on the permission settings for the user 101.

As another example, the proxy server 110 may identify the user 101 associated with the access request and determine user information for the user 101. In one embodiment, the access request may comprise user information for the user 101. In another embodiment, the access request may comprise a user identifier and the proxy server 110 may use the user identifier to obtain user information. The proxy server 110 determines whether the user 101 is allowed to access the requested content based on the user information. For example, the user information may indicate the location of the user 101 and the proxy server 110 may determine whether the user 101 is allowed to access the content based on their location. For instance, the proxy server 110 may determine there are laws or other restrictions that prohibit the user 101 from accessing the content based on their location. In some instances, the proxy server 110 may determine the location of the user 101 and/or the content is associated with a high level of risk which may prohibit the user 101 from accessing the content. In other examples, the proxy server 110 may determine whether the user 101 is allowed to access the requested content based on their department, title, user device 106, browser 114, and/or any other suitable type of information associated with the user 101.

As another example, the proxy server 110 may identify the user 101 associated with the access request and authenticate the user 101 to determine whether the user 101 is able to access the requested content. For example, the system 100 may be configured such that only authenticated users 101 may be able to request and/or access content from the public network 104. The proxy server 110 may employ any suitable authentication technique and protocol to authenticate the user 101.

The proxy server 110 may use any number of or combination of access rules 111 for determining whether the user 101 is able to access the requested content. The proxy server 110 generates an access request in response to determining whether the user 101 is able to access the requested content. The access request response comprises an approval for the user device 106 to access the destination address and content associated with the destination address in response to determining the content associated with the access request satisfies a set of access rules 111. In one embodiment, the access request response may comprise an approval code (e.g. an alphanumeric code) indicating the approval from the proxy server 110 to access the requested content. In other embodiments, the access request response may use any other suitable mechanism (e.g. flag bits) for indicating the approval from the proxy server 110. The access request response comprises a denial for the user device 106 to access the destination address and content associated with the destination address in response to determining the content associated with the access request does not satisfies a set of access rules 111. The access request response may use any suitable mechanism (e.g. flag bits) for indicating the denial from the proxy server 110. The access request response may further comprise any other suitable information or combinations thereof.

At step 318, the proxy server 110 sends the access request response to the user device 106 via the routing device 108. The access request response comprises the indication of either an approval or a denial for the user device 106 to access the destination address and content associated with the destination address. The proxy server 110 sends the access approval message using any suitable type of message formatting and/or messaging protocol. At step 320, the routing device 108 receives the access request response from the proxy server 110 and forwards the access request response to the user device 106.

At step 322, the user device 106 determines whether the access request was approved based on the access request response. For example, the user device 106 determines whether the received access request response comprises an indication of an approval for accessing the destination address and/or content associated with the destination address. The user device 106 proceeds to step 324 in response to determining the access request was approved by the proxy server 110. Otherwise, the user device 106 terminates method 300 when the user device 106 does not receive approval from the proxy server 110 to access the destination address and/or content associated with the destination address.

At step 324, the user device 106 sends an access approval message to the routing device 108. The access approval message comprises an indication of the approval from the proxy server 110 for the user device 106 to access the destination address and content associated with the destination address. For example, the access approval message may comprise an approval code received from the proxy server 110. In other examples, the access approval may use any other suitable technique for indicating the approval received from the proxy server 110. The access approval message may further comprise any other suitable information or combinations thereof. The user device 106 sends the access approval message using any suitable type of message formatting and/or messaging protocol.

At step 326, the routing device 108 configures data traffic routing between the user device 106 and the destination address using public links 118. The routing device 108 configures itself to allow the user device 106 to communicate (i.e. send and receive) data with an external site 120 in the public network 104 using public links 118. In this configuration, the user device 106 is able to achieve improve performance for accessing and streaming content using public links 118. Public links 118 allow the user device 106 to access the requested content using high speed connections without reducing the bandwidth, the number of available resources, or the performance of the system 100.

At step 328, the user device 106 communicates data with the destination address, for example, an external site 120 at the destination address. In other words, the user device 106 is able to request data content from the destination address and to stream or download the requested data content using public links 118. For example, the user device 106 may communicate HTTP and/or HTTPS data traffic with the network device 119 in the public network 104 using public links 118.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A network routing system comprising:
   a routing device comprising a network routing engine implemented by a processor, configured to:
   configure data traffic routing for a network device within a private network using private links, wherein:
   private links allow signal communications between the network device and other devices in the private network; and
   configuring data traffic routing for the network device within the private network blocks the network device from communicating with other network devices in a public network;
   receive an access request requesting access data content at a destination address in the public network from the network device, wherein the access request comprises the destination address for the data content in the public network;
   send the access request to a proxy server in the private network;
   receive an access request response from the proxy server, wherein the access request response indicates an approval for accessing the data content at the destination address;
   send the access request response to the network device, wherein the access request response comprises the approval for accessing the data content at the destination address;

receive an access approval message from the network device, wherein the access approval message comprises the approval for accessing the data content at the destination address;
configure data traffic routing between the network device and the destination address using public links in response to receiving the access approval message, wherein:
public links allow signal communications between the network device and a device associated with the destination address in the public network; and
configuring data traffic routing between the network device and the destination address bypasses the proxy server; and
communicate data traffic between the network device and the destination address using public links; and
the proxy server in signal communications with the routing device, configured to:
receive the access request;
determine whether content associated with the access request satisfies a set of access rules;
generate the access request response in response to determining the content associated with the access request satisfies the set of access rules; and
send the access request response.

2. The system of claim 1, wherein determining whether the content associated with the access request satisfies the set of access rules comprises:
determining the content has been cached;
accessing the cached content; and
determining the cached content passes a threat detection analysis.

3. The system of claim 1, wherein determining whether the content associated with the access request satisfies the set of access rules comprises:
determining the content is not cached;
accessing the content from the destination address; and
determining the content passes a threat detection analysis.

4. The system of claim 1, wherein determining whether the content associated with the access request satisfies the set of access rules comprises:
identifying a user associated with the access request;
determining permission settings for the user; and
determining the user is allowed to access content associated with the access request based on the permission settings.

5. The system of claim 1, wherein determining whether the content associated with the access request satisfies the set of access rules comprises:
identifying a user associated with the access request;
determining a location for the user; and
determining the user is allowed to access content associated with the access request based on the location for the user.

6. The system of claim 1, wherein determining whether the content associated with the access request satisfies the set of access rules comprises:
identifying a user associated with the access request; and
authenticating the user associated with the access request.

7. The system of claim 1, wherein determining whether the content associated with the access request satisfies the set of access rules comprises:
determining whether the content is cached; and
accessing the content from the destination address in response to determining the content is not cached.

8. A network routing method, comprising:
configuring, by a routing device, data traffic routing for a network device within a private network using private links, wherein:
private links allow signal communications between the network device and other devices in the private network; and
configuring data traffic routing for the network device within the private network blocks the network device from communicating with other network devices in a public network;
receiving, by the routing device, an access request requesting access to data content at a destination address in the public network from the network device, wherein the access request comprises the destination address for the data content in the public network;
sending, by the routing device, the access request to a proxy server in the private network;
determining, by the proxy server, whether content associated with the access request satisfies a set of access rules;
generating, by the proxy server, an access request response in response to determining the content associated with the access request satisfies the set of access rules, wherein the access request response indicates an approval for accessing the data content at the destination address;
sending, by the proxy server, the access request response to the routing device, wherein the access request response comprises the approval for accessing the data content at the destination address;
sending, by the routing device, the access request response to the network device;
receiving, by the routing device, an access approval message from the network device, wherein the access approval message comprises the approval for accessing the data content at the destination address;
configuring, by the routing device, data traffic routing between the network device and the destination address using public links in response to receiving the access approval message, wherein:
public links allow signal communications between the network device and a device associated with the destination address in the public network; and
configuring data traffic routing between the network device and the destination address bypasses the proxy server; and
communicating, by the routing device, data traffic between the network device and the destination address using public links.

9. The method of claim 8, wherein determining whether the content associated with the access request satisfies the set of access rules comprises:
determining, by the proxy server, the content has been cached;
accessing, by the proxy server, the cached content; and
determining, by the proxy server, the cached content passes a threat detection analysis.

10. The method of claim 8, wherein determining whether the content associated with the access request satisfies the set of access rules comprises:
determining, by the proxy server, the content is not cached;
accessing, by the proxy server, the content from the destination address; and
determining, by the proxy server, the content passes a threat detection analysis.

11. The method of claim 8, wherein determining whether the content associated with the access request satisfies the set of access rules comprises:
   identifying, by the proxy server, a user associated with the access request;
   determining, by the proxy server, permission settings for the user; and
   determining, by the proxy server, the user is allowed to access content associated with the access request based on the permission settings.

12. The method of claim 8, wherein determining whether the content associated with the access request satisfies the set of access rules comprises:
   identifying, by the proxy server, a user associated with the access request;
   determining, by the proxy server, a location for the user; and
   determining, by the proxy server, the user is allowed to access content associated with the access request based on the location for the user.

13. The method of claim 8, wherein determining whether the content associated with the access request satisfies the set of access rules comprises:
   identifying, by the proxy server, a user associated with the access request; and
   authenticating, by the proxy server, the user associated with the access request.

14. The method of claim 8, wherein determining whether the content associated with the access request satisfies the set of access rules comprises:
   determining, by the proxy server, whether the content is cached; and
   accessing, by the proxy server, the content from the destination address in response to determining the content is not cached.

15. A device, comprising:
   a network interface configured to:
      receive an access request requesting access to data content at a destination address in a public network from the network device, wherein the access request comprises the destination address for the data content in the public network;
      send the access request to a proxy server in the private network;
      receive an access request response from the proxy server in response to the proxy server determining content associated with the access request satisfies a set of access rules, wherein the access request response indicates an approval for accessing the data content at the destination address;
      send the access request response to the network device, wherein the access request response comprises the approval for accessing the data content at the destination address;
      receive an access approval message from the network device, wherein the access approval message comprises the approval for accessing the data content at the destination address; and
      communicate data traffic between the network device and the destination address using public links; and
   a processor operably coupled to the network interface, configured to implement a network routing engine configured to:
      configure data traffic routing for a network device within a private network using private links, wherein:
         private links allow signal communications between the network device and other devices in the private network; and
         configuring data traffic routing for the network device within the private network blocks the network device from communicating with other network devices in the public network; and
      configure data traffic routing between the network device and the destination address using public links in response to receiving the access approval message, wherein:
         public links allow signal communications between the network device and a device associated with the destination address in the public network and
         configuring data traffic routing between the network device and the destination address bypasses the proxy server.

16. The device of claim 15, wherein determining the content associated with the access request satisfies the set of access rules comprises:
   determining the content has been cached;
   accessing the cached content; and
   determining the cached content passes a threat detection analysis.

17. The device of claim 15, wherein determining the content associated with the access request satisfies the set of access rules comprises:
   determining the content is not cached;
   accessing the content from the destination address; and
   determining the content passes a threat detection analysis.

18. The device of claim 15, wherein determining the content associated with the access request satisfies the set of access rules comprises:
   identifying a user associated with the access request;
   determining permission settings for the user; and
   determining the user is allowed to access content associated with the access request based on the permission settings.

19. The device of claim 15, wherein determining the content associated with the access request satisfies the set of access rules comprises:
   identifying a user associated with the access request;
   determining a location for the user; and
   determining the user is allowed to access content associated with the access request based on the location for the user.

20. The device of claim 15, wherein determining the content associated with the access request satisfies the set of access rules comprises:
   identifying a user associated with the access request; and
   authenticating the user associated with the access request.

* * * * *